United States Patent
Mischler et al.

(10) Patent No.: US 9,157,388 B2
(45) Date of Patent: *Oct. 13, 2015

(54) METHODS AND SYSTEMS FOR AIR FUEL RATIO CONTROL

(71) Applicant: General Electric Company, Schenectady, NY (US)

(72) Inventors: James Robert Mischler, Girard, PA (US); Jassin Marcel Fritz, Garching (DE); Sebastian Walter Freund, Garching (DE)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/533,896

(22) Filed: Nov. 5, 2014

(65) Prior Publication Data

US 2015/0053176 A1    Feb. 26, 2015

Related U.S. Application Data

(63) Continuation of application No. 13/152,678, filed on Jun. 3, 2011, now Pat. No. 8,903,575.

(51) Int. Cl.
*F02D 41/00* (2006.01)
*F02D 29/06* (2006.01)
*F02D 41/14* (2006.01)
*F02D 31/00* (2006.01)
*F02M 25/07* (2006.01)
(Continued)

(52) U.S. Cl.
CPC .......... *F02D 29/06* (2013.01); *F02D 31/007* (2013.01); *F02D 41/0007* (2013.01); *F02D 41/0072* (2013.01); *F02D 41/04* (2013.01); *F02D 41/1454* (2013.01); *F02M 25/0707* (2013.01); *F02D 41/107* (2013.01); *F02D 2041/1419* (2013.01); *F02D 2250/32* (2013.01); *F02M 25/0709* (2013.01); *Y02T 10/47* (2013.01)

(58) Field of Classification Search
CPC ..... B60W 10/06; B60W 10/08; B60W 20/00; B61C 5/00; B61C 5/02; F02D 21/04; F02D 21/08; F02D 29/06; F02D 31/007; F02D 41/00; F02D 41/0047; F02D 41/005; F02D 41/0052; F02D 41/0072; F02D 41/1445; F02D 41/1454; F02D 41/146; F02D 41/1466; F02D 2200/101; F02M 25/0707; F02M 25/0709; Y02T 10/10; Y02T 10/40; Y02T 10/42; Y02T 10/44; Y02T 10/47; Y02T 10/54
USPC ............... 701/19–20, 22, 100–105, 108, 110; 123/395; 180/65.245, 65.28; 903/902
See application file for complete search history.

(56) References Cited

U.S. PATENT DOCUMENTS

| | | | | |
|---|---|---|---|---|
| 5,172,550 | A * | 12/1992 | Takeshima | ............ 60/278 |
| 5,339,784 | A * | 8/1994 | Fukui | ............ 123/406.52 |
| 5,364,322 | A * | 11/1994 | Fukui | ............ 477/108 |

(Continued)

*Primary Examiner* — Thomas G Black
*Assistant Examiner* — Ce Li
(74) *Attorney, Agent, or Firm* — GE Global Patent Operation; John A. Kramer

(57) ABSTRACT

Various methods and systems for an engine driving an electrical power generation system are provided. In one embodiment, an example method for an engine driving an electrical power generation system includes adjusting an engine speed in response to a relationship between oxygen and fuel while maintaining a power transmitted to the electrical power generation system.

19 Claims, 3 Drawing Sheets

(51) Int. Cl.
*F02D 41/04* (2006.01)
*F02D 41/10* (2006.01)

(56) References Cited

U.S. PATENT DOCUMENTS

| | | | | |
|---|---|---|---|---|
| 5,901,683 | A * | 5/1999 | Patel | 123/352 |
| 6,726,594 | B2 * | 4/2004 | Mizuno et al. | 477/37 |
| 7,577,511 | B1 * | 8/2009 | Tripathi et al. | 701/103 |
| 7,650,222 | B2 * | 1/2010 | Shiraishi et al. | 701/103 |
| 7,742,866 | B2 * | 6/2010 | McLain et al. | 701/103 |
| 8,280,569 | B2 * | 10/2012 | Kumar et al. | 701/20 |
| 8,548,715 | B2 * | 10/2013 | Gallagher et al. | 701/102 |
| 2002/0113439 | A1 * | 8/2002 | Thomas et al. | 290/40 A |
| 2003/0022753 | A1 * | 1/2003 | Mizuno et al. | 477/43 |
| 2004/0194746 | A1 * | 10/2004 | Yamaoka et al. | 123/90.15 |
| 2007/0235009 | A1 * | 10/2007 | Nakashima et al. | 123/458 |
| 2008/0022661 | A1 * | 1/2008 | Yan | 60/286 |
| 2008/0022966 | A1 * | 1/2008 | Tamma et al. | 123/299 |
| 2008/0077285 | A1 * | 3/2008 | Kumar et al. | 701/19 |
| 2008/0202376 | A1 * | 8/2008 | Meltser et al. | 105/26.05 |
| 2008/0202377 | A1 * | 8/2008 | Meltser et al. | 105/62.1 |
| 2008/0314042 | A1 * | 12/2008 | Greuter et al. | 60/602 |
| 2009/0076708 | A1 * | 3/2009 | Shiraishi et al. | 701/103 |
| 2009/0088947 | A1 * | 4/2009 | Mc Lain et al. | 701/103 |
| 2009/0173314 | A1 * | 7/2009 | Whitney et al. | 123/350 |
| 2011/0066351 | A1 * | 3/2011 | Gallagher et al. | 701/102 |
| 2011/0132225 | A1 * | 6/2011 | Meltser et al. | 105/62.1 |

* cited by examiner

METHODS AND SYSTEMS FOR AIR FUEL RATIO CONTROL

CROSS-REFERENCE TO RELATED APPLICATIONS

This application is a continuation of U.S. application Ser. No. 13/152,678 filed Jun. 3, 2011, and titled METHODS AND SYSTEMS FOR AIR FUEL RATIO CONTROL, which is hereby incorporated by reference in its entirety for all purposes.

FIELD

Embodiments of the subject matter disclosed herein relate to methods and systems for controlling air fuel ratio in an internal combustion engine.

BACKGROUND

Combustion in an engine, such as an internal combustion engine, occurs with an amount of fuel and an amount of air present in a cylinder of the engine. The ratio of the amount of air to the amount of fuel is known as the air fuel ratio. Under some conditions, an overly low air fuel ratio may result in increased particulate matter emissions, while an overly high air fuel ratio may result in increased nitrogen oxide ($NO_x$) emissions and higher fuel consumption due to increased pumping losses.

In some approaches, the air fuel ratio may be adjusted by controlling a wastegate on a turbocharger or controlling a variable geometry turbocharger. In this manner, an amount of boost provided by the turbocharger may be adjusted, thereby changing an amount of air available for combustion in the cylinder. By adjusting the boost, however, the engine power output may be affected, even when there is no command to change the engine power. As such, while air fuel ratio control may be improved, overall engine output control may degrade.

BRIEF DESCRIPTION

In one embodiment, a method for an engine driving an electrical power generation system includes adjusting an engine speed in response to a relationship between oxygen and fuel while maintaining a power transmitted to the electrical power generation system. By maintaining the power transmitted to the electrical power generation system, a vehicle speed may be maintained, for the example where the engine is included in a propulsion system of a vehicle. Further, changing the ratio of engine speed to vehicle speed while maintaining the vehicle speed and power may result in a proportional effect on the relationship between oxygen and fuel, such as engine air fuel ratio or oxygen-to-fuel ratio. As such, the air fuel ratio may be controlled without changing the boost provided by a turbocharger, or in addition to changing the boost if desired. In this manner, engine performance may be maintained while decreasing emissions.

In another embodiment, a system comprises a controller configured for operable coupling with an engine. The engine is configured to drive an electrical power generation system. The controller is further configured to adjust an engine speed of the engine in response to a relationship between oxygen and fuel while maintaining a power transmitted to the electrical power generation system.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel. The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for an engine driving an electrical power generation system. In one example method, an engine speed is adjusted in response to an air fuel ratio (e.g., a difference between an actual/current air fuel ratio and a desired air fuel ratio of the engine, as determined by or derived from sensor data or otherwise) while a power transmitted by the engine to the electrical power generation system is maintained. As will be described in greater detail below, engine speed may be adjusted by adjusting fueling and adjusting generator torque, for example. In this manner, the power transmitted by the engine to the electrical power generation system may be maintained such that a vehicle speed may be maintained. Further, changing the engine speed to vehicle speed ratio by changing the engine speed and maintaining the vehicle speed and power may proportionally affect engine speed and inversely affect engine torque, resulting in a proportional effect on engine air fuel ratio.

Figure 1:
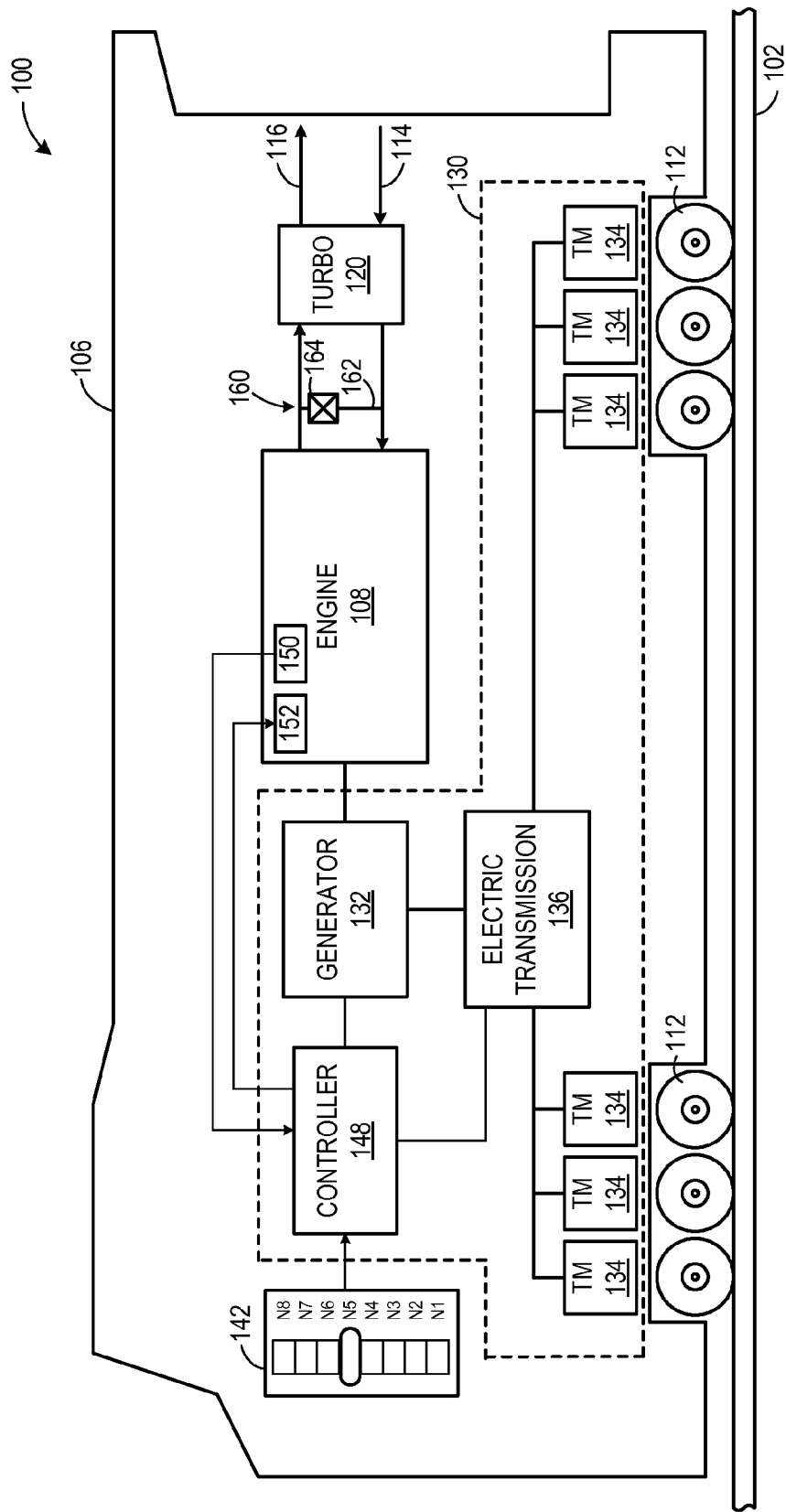
FIG. 1 shows a schematic diagram of an example embodiment of a rail vehicle with an exhaust gas treatment device according to an embodiment of the invention.

In some embodiments, the method may be configured for an engine in a vehicle, such as a locomotive or other rail vehicle. For example, FIG. 1 shows a block diagram of an example embodiment of a vehicle system 100, herein depicted as a rail vehicle 106, configured to run on a rail 102 via a plurality of wheels 112. As depicted, the rail vehicle 106 includes an engine 108, such as an internal combustion engine. In other non-limiting embodiments, the engine 108 may be a stationary engine, such as in a power-plant application, or an engine in a ship or off-highway vehicle propulsion system.

The engine 108 receives intake air for combustion from an intake passage 114. The intake passage 114 receives ambient air from an air filter (not shown) that filters air from outside of the rail vehicle 106. Exhaust gas resulting from combustion in the engine 108 is supplied to an exhaust passage 116. Exhaust gas flows through the exhaust passage 116, and out of an exhaust stack (not shown) of the rail vehicle 106. In one embodiment, the engine 108 is a diesel engine that combusts air and diesel fuel through compression ignition. In other non-limiting embodiments, the engine 108 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 108 is coupled to an electric power generation system 130, which includes an alternator/generator 132 and electric traction motors 134. For example, the engine 108 is a diesel engine that generates a torque output that is transmitted to the generator 132 which is mechanically coupled to the engine 108. The generator 132 produces electrical power that may be stored and applied for subsequent propagation to a variety of downstream electrical components. As an example, the generator 132 may be electrically coupled to a plurality of traction motors 134 via an electric transmission system 136, and the generator 132 may provide electrical power to the plurality of traction motors 134. The electric transmission system 136 may include frequency converters, such as rectifiers. As depicted, the plurality of traction motors 134 are each connected to one of a plurality of wheels 112 to provide tractive power to propel the rail vehicle 106. One example rail vehicle configuration includes one traction motor per wheel. As depicted herein, six pairs of traction motors correspond to each of six pairs of wheels of the rail vehicle. In one aspect, the motors 134 are not involved in generating power per se, and are instead part of the power generation system in the sense of being a load of the power generation system. In another aspect, the motors and related components, such as power converters and the like, may be configured for use in dynamic braking operations, where braking is carried out by temporarily operating the motors as generators, and thereby providing a resistance to the wheels operably connected to the motors. Dynamic braking generated electricity may be stored for later use, used at the time it is generated, and/or dissipated as waste electricity.

The vehicle system 100 further includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger 120. The wastegate may be opened, for example, to divert the exhaust gas flow away from the turbine. In this manner, the rotating speed of the compressor, and thus the boost provided by the turbocharger 120 to the engine 108 may be regulated. Further, in some examples, the wastegate may be adjusted during transient conditions to adjust an air fuel ratio of the engine in combination with the embodiments described with reference to FIGS. 2 and 3.

The vehicle system 100 further may include an exhaust gas recirculation (EGR) system 160, as depicted in FIG. 1, which routes exhaust gas from the exhaust passage 116 upstream of the turbocharger 120 to the intake passage downstream of the turbocharger 120. The EGR system 160 includes an EGR passage 162 and an EGR valve 164 for controlling an amount of exhaust gas that is recirculated from the exhaust passage 116 of engine 108 to the intake passage 114 of engine 108. By introducing exhaust gas to the engine 108, the amount of available oxygen for combustion is decreased, thereby reducing the combustion flame temperatures and reducing the formation of nitrogen oxides (e.g., $NO_x$). The EGR valve 164 may be an on/off valve controlled by a controller 148, or it may control a variable amount of EGR, for example. In some embodiments, as shown in FIG. 1, the EGR system 160 may further include an EGR cooler (not shown) to reduce the temperature of the exhaust gas before it enters the intake passage 114. As depicted in the non-limiting example embodiment of FIG. 1, the EGR system 140 is a high-pressure EGR system. In other embodiments, the vehicle system 100 may additionally or alternatively include a low-pressure EGR system, routing EGR from a location downstream of the turbocharger to a location upstream of the turbocharger.

The vehicle system 100 may further include an exhaust gas treatment system (not shown) coupled in the exhaust passage to reduce regulated emissions. In one example embodiment, the exhaust gas treatment system may include a diesel oxidation catalyst (DOC) and a diesel particulate filter (DPF). In other embodiments, the exhaust gas treatment system may additionally or alternatively include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

As depicted in FIG. 1, the vehicle system 100 further includes a controller 148 to control various components related to the vehicle system 100. As an example, various components of the vehicle system may be coupled to the controller 148 via a communication channel or data bus. In one example, the controller 148 includes a computer control system. The controller 148 may additionally or alternatively include non-transient computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, intake manifold air pressure, boost pressure, exhaust pressure, ambient pressure, ambient temperature, exhaust temperature, etc. Correspondingly, the controller 148 may control the vehicle system 100 by sending commands to various components such as the traction motors 134, the alternator/generator 132, cylinder valves, fuel injectors, the notched throttle 142, etc. Other actuators may be coupled to various locations in the rail vehicle.

In one example, the controller 148 may receive communication from notch sensors coupled to a notched throttle 142 indicating a power level. For example, each notch of the notched throttle 142 may correspond to a discrete power level. Although eight notch settings are depicted in the example embodiment of FIG. 1, in other embodiments, the throttle notch may have more than eight notches or less than eight notches, as well as notches for idle and dynamic brake modes. In some embodiments, the notch setting may be selected by an operator of the rail vehicle 106. In other embodiments, the controller 148 may determine a trip plan (e.g., a trip plan may be generated using trip optimization software, such at Trip Optimizer™ available from General Electric Company) including notch settings based on engine and/or rail vehicle operating conditions and/or the ambient levels of one or more regulated emissions. In another example, the controller 148 may increase the fuel pulse duration (e.g., duration of the fuel injector opening) to one or more fuel injectors in response to a request for increased engine speed. Further, the controller may increase generator torque in response to a request for increased engine speed. Such an example will be described in greater detail below with reference to FIGS. 2-3.

In one example embodiment, a vehicle system comprises an engine and an electric power generation system coupled to the engine. The electric power generation system includes a generator mechanically coupled to the engine and electric traction motors electrically coupled to the generator. The vehicle system further comprises a plurality of wheels to which the electric traction motors provide tractive power based on a power setting. Further still, the vehicle system comprises a controller configured to identify the power setting and an air fuel ratio, and in response to the air fuel ratio crossing a threshold, adjusting an engine speed while maintaining tractive power transmitted to the plurality of wheels.

Figure 2:
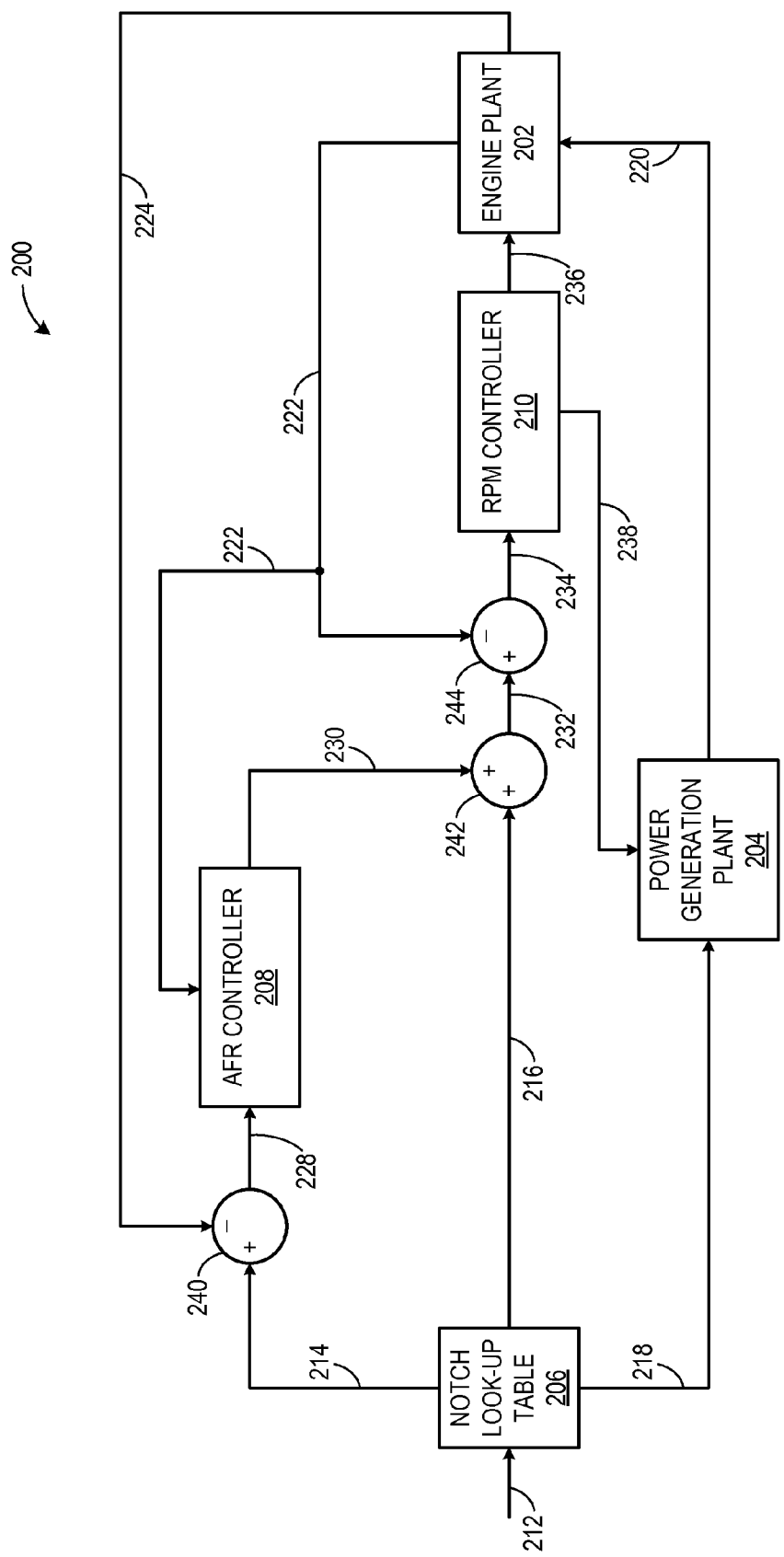
FIG. 2 shows a block diagram of an example embodiment of a control system according to an embodiment of the invention.

Continuing to FIG. 2, a block diagram of a closed loop control system 200 for a vehicle system including an engine driving an electric power generation system, such as vehicle system 100 described above with reference to FIG. 1, is shown. Specifically, the control system 200 determines a desired change in air fuel ratio and adjusts the vehicle speed accordingly. In other embodiments, an open-loop control system may be employed. In such an embodiment, a look-up table may be used to determine an engine speed based on the air fuel ratio target without a measured air fuel ratio.

As depicted in FIG. 2, a notch setting is selected at 212 and read by the notch look-up table at 206. The notch look-up table 206 sends signals regarding settings for the selected notch. More specifically, in one embodiment, a controller, such as the controller 148 of FIG. 1, refers to or otherwise implements the look-up table 206, based on code stored in non-transient computer readable storage media or otherwise, and generates the signals regarding settings for the selected notch. For example, a power reference 218 is sent to a power generation plant 204, which includes an alternator/generator and electric motors coupled to wheels of the vehicle, such as the electric power generation system 130 described above with reference to FIG. 1. The power reference 218 may be a power level corresponding to the selected notch setting, and the power generation plant 204 is responsive to the setting in that the power generation plant responds by providing an actual power level responsive to the power reference 218. In one example, a lower notch setting (e.g., notch 3) may correspond to a lower power level, while a higher notch setting (e.g., notch 7) may correspond to a higher power level. Further, an engine speed (RPM) reference 216 is sent to a summing point 242 before an engine speed controller 210. The engine speed reference may be an initial speed target based on the selected power setting.

Further still, an air fuel ratio (AFR) reference 214 is sent to a summing point 240 before an air fuel ratio controller 208. In some examples, the air fuel ratio reference 214 may be an initial air fuel ratio based on the selected power setting. In other examples, the air fuel ratio reference 214 may be a desired air fuel ratio based on ambient conditions and/or ambient and/or exhaust levels of regulated emissions. As should be appreciated, each of the stated references 218, 214, 216, etc. is a signal containing the indicated information, e.g., in one aspect, the power reference 218 is a signal having information about a power level corresponding to the selected notch setting. It should be understood the AFR reference 214 may be a relationship between oxygen and fuel. In one example, the relationship between oxygen and a fuel may be an exhaust air fuel ratio. In another example, the relationship between oxygen and fuel may include an excess amount of un-burned oxygen relative to delivered fuel. For example, considering excess oxygen in the cylinder can account for effects of not only fresh air relative to injected fuel but also effects from an EGR system, where lean combustion gasses are recirculated back to the intake, thus providing an additional source of unburned oxygen to the cylinder.

The power generation plant 204 is in communication with an engine plant 202, such as engine 108 described above with reference to FIG. 1. For example, a signal indicating the actual power 220 (e.g., measured power) is sent from the power generation plant 204 to the engine plant 202. The actual power 220 may be the power supplied from the power generation plant 204 to the wheels of the vehicle, based on the power reference 218 received from the notch look-up table 206, to achieve a desired vehicle speed.

The engine plant 202 sends a signal indicating the actual air fuel ratio 224 (e.g., measured air fuel ratio) to the summing point 240. At the summing point 240, the air fuel ratio reference 214 is summed with the actual air fuel ratio 224 and an air fuel ratio error signal 228 is produced. The air fuel ratio error signal 228 is then transmitted to the air fuel ratio controller 208, which may be a gain scheduled controller, for example. The air fuel ratio controller 208 further receives a signal indicating an actual engine speed 222 (e.g., measured engine speed) from the engine plant 202. In this way, the air fuel ratio controller 208 may determine a change in engine speed (e.g., engine speed delta) based on the air fuel ratio error 228 and the actual engine speed 22 such that the engine speed may be adjusted to change the air fuel ratio to the desired air fuel ratio.

In some embodiments, the control system may further include input from an EGR system. As one example, an EGR modifier (e.g., an amount of oxygen contributed by EGR) may be added to the air fuel ratio reference 214 before the air fuel ratio controller 208 determines the engine speed delta signal 230. At higher EGR rates, for example, a greater amount of oxygen is recirculated, thereby decreasing an amount of fresh air (e.g., ambient air) needed to obtain a desired air fuel ratio. As such, the air fuel ratio reference may be variable with EGR rate.

Continuing with FIG. 2, the air fuel ratio controller 208 sends the engine speed delta signal 230 to the summing point 242 where it is summed with the engine speed reference 216 to produce a modified engine speed reference 232. The modified engine speed reference 232 indicates the speed of engine rotation to produce the desired air fuel ratio, for example. The modified engine speed reference 232 is then sent to summing point 244 where it is summed with the actual engine speed 222 from the engine plant 202 to produce an engine speed error 234. The engine speed error 234 is then transmitted to the engine speed controller 210. As an example, the engine speed controller 210 may be a proportional integral derivative controller which reduces the error in engine speed by adjusting another variable, such as fueling and/or generator torque. Thus, a signal indicating fuel rate 236 is sent to the engine plant 202. The fuel rate may include frequency of the fuel pulse as well as duration of the fuel pulse, for example. Further, a signal indicating generator torque 238 may be sent to the power generation plant 204 such that the generator torque may be adjusted separately from the fueling in order to change the engine speed. For example, both fueling and generator torque may be adjusted, in different ways, to adjust the engine speed to the desired speed.

In this manner, a relative ratio of engine speed to traction motor speed, or vehicle speed, (e.g., an effective transmission ratio) may be varied continuously over a wide range, as the engine speed may be adjusted by adjusting the fuel rate of the engine and adjusting the generator torque while a power transmitted to the electrical power generation system is maintained. Changing the transmission ratio at constant vehicle speed and tractive force (e.g., power), for example, under steady state conditions, will proportionally affect engine speed and inversely affect engine torque. Furthermore, the impact of the transmission ratio change on engine speed and torque results in a proportional effect on engine air fuel ratio. Thus, by adjusting the engine speed while maintaining a vehicle speed and maintaining a power transmitted to the electrical power generation system based on the notch setting, an air fuel ratio of the engine may be varied such that a difference between the actual air fuel ratio and the desired air fuel ratio is reduced.

In one example method for a vehicle system (the vehicle system including an engine driving an electrical power generation system which includes a generator and a plurality of electric traction motors), the method comprises identifying a power setting, the power setting indicating a tractive power to be transmitted to a plurality of wheels, each of the wheels coupled to one of the electric traction motors. The method further comprises identifying an air fuel ratio, and adjusting an engine speed in response to the air fuel ratio crossing a threshold while maintaining the power setting even while adjusting engine speed.

In another embodiment of a method for a vehicle or other engine-based system, the method comprises determining an effective transmission ratio (e.g., relative engine speed to vehicle or traction motor speed ratio) needed to achieve a desired air fuel ratio. The method further comprises adjusting fueling to adjust engine speed in response to the desired air fuel ratio. An example of an embodiment of such a method is shown and described in FIG. 3, as follows.

Figure 3:
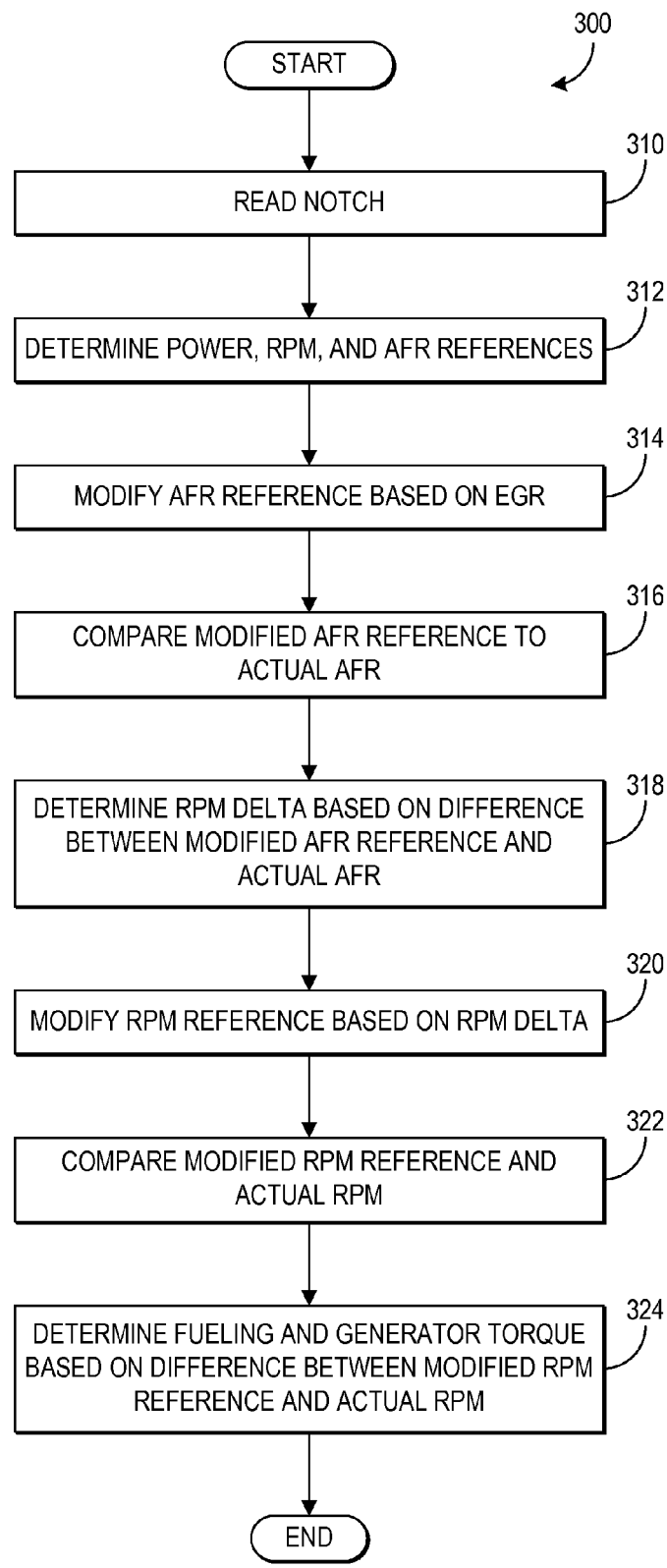
FIG. 3 shows a flow chart illustrating a method for controlling air fuel ratio in a system with an engine driving an electric power generation system.

FIG. 3 shows a flow chart illustrating another example method 300 for controlling the air fuel ratio in a system with an engine driving an electric power generation system, such as the vehicle system 100 described above with reference to FIG. 1 and the control system 200 described above with reference to FIG. 2. Specifically, the method 300 determines a transmission ratio (e.g., engine speed to traction motor speed ratio) needed to achieve a desired air fuel ratio and adjusts fueling to adjust engine speed in response to the desired air fuel ratio.

At 310 of method 300, the notch setting (e.g., power setting) is identified by reading the notch setting. As described above, in some examples the notch setting may be selected by an operator of the vehicle. In other examples, the notch setting may be determined by the controller based on a trip plan.

Once the notch setting is determined, method 300 continues to 312 where a power reference, an engine speed reference, and an air fuel ratio reference are determined. The power reference may be a power level corresponding to the notch setting, for example. As described above, the engine speed reference may be an initial speed based on the notch setting. Further, the air fuel ratio reference may be an initial air fuel ratio based on the notch setting. In another embodiment, the air fuel ratio reference may be a desired air fuel ratio based on ambient condition, such as ambient temperature, ambient pressure, and/or ambient levels of regulated emissions. As another example, the desired air fuel ratio may be based on exhaust levels of regulated emissions. For example, a high air fuel ratio may result in nitrogen oxide ($NO_x$) emissions and higher fuel consumption due to increased pumping losses. A low air fuel ratio may result in high particulate matter emission.

At 314 of method 300, the air fuel ratio reference is modified based on an EGR rate. Exhaust gas recirculation contributes oxygen to an oxygen-to-fuel ratio. At higher EGR rates, therefore, a greater amount of oxygen may be recirculated to the cylinders of the engine and the need for fresh air (e.g., fresh air fuel ratio) decreases. For example, a high EGR rate may result in higher particulate matter emission, and a low EGR rate may result in high $NO_x$ emissions. As such, in some embodiments, the air fuel ratio and EGR rate may be controlled simultaneously, and the air fuel ratio reference may be modified due to an amount of EGR entering the cylinders of the engine. In one example, the engine speed may be increased in response to an increasing EGR rate so that the air fuel ratio does not fall below a threshold.

At 316 of method 300, the modified air fuel ratio reference is compared to the actual air fuel ratio. As an example, it may be determined that the air fuel ratio is crossing or approaching a threshold. The threshold may be based on exhaust level of regulated emissions. In some examples, it may be determined that the actual air fuel ratio is falling below a threshold (e.g., a threshold minimum). In such an example, particulate matter emission may be increasing, for example, due to the decreasing air fuel ratio. In other examples, it may be determined that the actual air fuel ratio is increasing above a threshold (e.g., a maximum threshold). In such an example, $NO_x$ emission may be increasing, for example, due to the increasing air fuel ratio.

After the modified air fuel ratio reference is compared to the actual air fuel ratio, method 300 proceeds to 318 where an engine speed delta (e.g., an amount the engine speed needs to be changed to adjust the air fuel ratio to the desired air fuel ratio, as described above) is determined based on the difference between the modified air fuel ratio and the actual air fuel ratio. At 320 of method 300, the engine speed reference is modified by the engine speed delta. In this manner, the engine speed reference is adjusted to reflect an engine speed needed to increase or decreased the air fuel ratio, as desired.

At 322 of method 300, the modified engine speed reference (e.g., desired engine speed) is compared to the actual engine speed. In some examples, it may be determined that the actual engine speed is greater than the desired engine speed. In other examples, it may be determined that the actual engine speed is less than the desired engine speed.

One the difference in actual engine speed and the modified engine speed reference is determined, method 300 moves to 324 where engine fueling and generator torque are determined based on the difference between the actual engine speed and the modified engine speed reference to control engine output, such as speed and/or power. In one example, the method may include an intermediate step of determining fueling and generator torque by determining a desired effective transmission ratio. For example, determining the desired effective transmission ratio may include determining a change in engine speed and torque while maintaining the speed of the traction motors such that the tractive power of the wheels does not change, yet the air-fuel ratio is maintained at a desired air-fuel ratio. Adjusting the fueling may include adjusting one or more of injection timing, fuel pulse duration, and fuel injection pressure in one or more of the cylinders of the engine. In one example, the fuel pulse duration may be decreased such that less fuel is injected to the cylinders and the engine power decreases. Similarly, generator torque may be adjusted to increase or decrease the engine speed. As an example, the generator torque may be reduced in order to increase engine speed.

Thus, fueling and generator torque may be adjusted to adjust engine speed in response to a desired air fuel ratio and power. By maintaining the power transmitted to the electric power generation system from the engine, and thus the tractive power transmitted to the wheels of the vehicle, while adjusting the engine speed, the engine air fuel ratio may be proportionally adjusted. In this manner, frictional losses may be reduced and fuel economy may be increased.

In another embodiment, a system comprises a controller configured for operable coupling with an engine. The engine is configured to drive an electrical power generation system. The controller is further configured to adjust an engine speed of the engine in response to a relationship between oxygen and fuel while maintaining a power transmitted to the electrical power generation system. (In another embodiment, the system may comprise the electrical power generation system, the engine, and the controller.)

In another embodiment, a system comprises an electrical power generation system, an engine configured to drive the electrical power generation system, and a controller. The controller is configured for operable coupling with the engine and to adjust an engine speed in response to a relationship between oxygen and fuel while maintaining a power transmitted to the electrical power generation system. The controller is configured to adjust the engine speed by adjusting generator torque and engine fueling. In other embodiments, the controller may be further configured to adjust the engine fueling by adjusting at least one of injection timing, fuel pulse duration, or fuel injection pressure.

In another embodiment, a system comprises an electrical power generation system, an engine configured to drive the electrical power generation system, and a controller. The controller is configured for operable coupling with the engine and to adjust an engine speed in response to a relationship between oxygen and fuel while maintaining a power transmitted to the electrical power generation system. The relationship between oxygen and fuel includes an air fuel ratio, and wherein the controller is configured to adjust the engine speed in response to the air fuel ratio by adjusting the engine speed in response to the air fuel ratio falling below a threshold.

In another embodiment, a system comprises an electrical power generation system, an engine configured to drive the electrical power generation system, and a controller. The controller is configured for operable coupling with the engine and to adjust an engine speed in response to a relationship between oxygen and fuel while maintaining a power transmitted to the electrical power generation system. The relationship between oxygen and fuel includes an air fuel ratio, and wherein the controller is configured to adjust the engine speed in response to the air fuel ratio by adjusting the engine speed in response to the air fuel ratio increasing above a threshold.

In another embodiment, a system comprises an electrical power generation system, an engine configured to drive the electrical power generation system, and a controller. The controller is configured for operable coupling with the engine and to adjust an engine speed in response to a relationship between oxygen and fuel while maintaining a power transmitted to the electrical power generation system. The power transmitted to the electrical power generation system is a selected power level based on a power setting, and wherein the engine is positioned in a rail vehicle and the power setting is a notch setting selected by an operator of the rail vehicle.

In another embodiment, a system comprises an electrical power generation system, an engine configured to drive the electrical power generation system, and a controller. The controller is configured for operable coupling with the engine and to adjust an engine speed in response to a relationship between oxygen and fuel while maintaining a power transmitted to the electrical power generation system. The engine is positioned in a vehicle, and the electrical power generation system includes a generator mechanically coupled to the engine and a plurality of electric motors electrically coupled to the generator to drive wheels of the vehicle. The plurality of electric motors may be configured to provide power to wheels of the vehicle.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator. The relationship between oxygen and fuel includes an air fuel ratio, and the air fuel ratio crossing the threshold includes the air fuel ratio falling below the threshold.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator. The relationship between oxygen and fuel includes an air fuel ratio, and the air fuel ratio crossing the threshold includes the air fuel ratio increasing above the threshold.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator. The vehicle system is a rail vehicle system, and the power setting is a notch setting of a notched throttle.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator. The controller is configured to adjust the engine speed based on an exhaust gas recirculation rate from an exhaust gas recirculation system which is configured to route exhaust gas from an exhaust passage to an intake passage of the engine. The controller may be further configured to adjust the engine speed in response to an increasing exhaust gas recirculation rate.

In another embodiment, a system comprises a controller configured for operable coupling with a vehicle system having an engine, a generator configured to be driven by the engine, a plurality of wheels, and a plurality of electric traction motors coupled to the plurality of wheels. The controller is configured to identify a power setting, the power setting indicating a tractive power to be transmitted by the plurality of wheels. The controller is configured to identify a relationship between oxygen and fuel (e.g., oxygen-to-fuel ratio). The controller is configured to adjust an engine speed of the engine in response to the relationship between oxygen and fuel crossing an air fuel ratio threshold while maintaining the power setting even while adjusting engine speed, the controller configured to adjust the engine speed by adjusting fueling to the engine and a torque of the generator. The air fuel ratio threshold is based on an exhaust level of particulate matter emission and nitrogen oxide emission.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a controller configured for operable coupling with an engine that is configured to drive an electrical power generation system, wherein the controller is further configured to adjust an engine speed of the engine in a closed loop in response to a relationship between oxygen and fuel crossing an air fuel ratio threshold while maintaining a tractive power transmitted to the electrical power generation system, the controller configured to adjust engine speed by adjusting fueling to the engine and torque of the electrical power generation system;
   wherein the engine includes a turbocharger arranged between an intake passage and exhaust passage of the engine;
   wherein the tractive power is an indication of an identified power setting; and
   wherein the relationship between oxygen and fuel includes an exhaust air fuel ratio.

2. The system of claim 1, wherein the controller is configured to further adjust the engine speed by adjusting generator torque.

3. The system of claim 1, wherein the controller is configured to adjust the engine fueling by adjusting at least one of injection timing, fuel pulse duration, or fuel injection pressure.

4. The system of claim 1, wherein the controller is configured to adjust the engine speed in response to the exhaust air fuel ratio by adjusting the engine speed in response to the exhaust air fuel ratio falling below a threshold.

5. The system of claim 1, wherein the controller is configured to adjust the engine speed in response to the exhaust air fuel ratio by adjusting the engine speed in response to the exhaust air fuel ratio increasing above a threshold.

6. The system of claim 1, wherein the tractive power transmitted to the electrical power generation system is a selected power level based on a power setting, and wherein the engine is positioned in a rail vehicle and the power setting is a notch setting selected by an operator of the rail vehicle.

7. The system of claim 1, wherein the engine is positioned in a vehicle, and the electrical power generation system includes a generator mechanically coupled to the engine and a plurality of electric motors electrically coupled to the generator to drive wheels of the vehicle.

8. The system of claim 7, wherein the plurality of electric motors are configured to provide power to wheels of the vehicle.

9. A system comprising:
a controller configured for operable coupling with a vehicle system having a boosted engine including a turbocharger arranged between an intake passage and an exhaust passage of the engine, a generator configured to be driven by the engine, a plurality of wheels, and a plurality of electric traction motors coupled to the plurality of wheels; wherein:
the controller is configured to identify a power setting, the power setting indicating a tractive power to be transmitted by the plurality of wheels;
the controller is configured to identify a relationship between oxygen and fuel including an exhaust air fuel ratio; and
the controller is configured to continuously adjust an engine speed of the engine in response to the relationship between oxygen and fuel crossing an exhaust air fuel ratio threshold while maintaining the power setting even while adjusting engine speed, the controller configured to adjust the engine speed by adjusting fueling to the engine and a torque of the generator.

10. The system of claim 9, wherein the exhaust air fuel ratio crossing the threshold includes the exhaust air fuel ratio falling below the threshold.

11. The system of claim 9, wherein the exhaust air fuel ratio crossing the threshold includes the exhaust air fuel ratio increasing above the threshold.

12. The system of claim 9, wherein the vehicle system is a rail vehicle system, and the power setting is a notch setting of a notched throttle.

13. The system of claim 9, wherein the controller is configured to adjust the engine speed based on an exhaust gas recirculation rate from an exhaust gas recirculation system which is configured to route exhaust gas from the exhaust passage to the intake passage of the engine.

14. The system of claim 13, wherein the controller is configured to adjust the engine speed in response to an increasing exhaust gas recirculation rate.

15. The system of claim 9, wherein the exhaust air fuel ratio threshold is based on an exhaust level of particulate matter emission and nitrogen oxide emission.

16. A vehicle system, comprising:
a boosted engine including a turbocharger arranged between an intake passage and an exhaust passage of the engine;
a generator mechanically coupled to the engine;
a plurality of electric traction motors electrically coupled to the generator;
a plurality of wheels to which the electric traction motors provide tractive power based on a power setting; and
a controller configured to identify the power setting and an exhaust air fuel ratio, and in response to the exhaust air fuel ratio crossing a threshold, adjusting an engine speed while maintaining the tractive power transmitted to the plurality of wheels, the controller configured to adjust engine speed by adjusting fueling to the engine and generator torque.

17. The vehicle system of claim 16, wherein adjusting the fueling to the engine includes adjusting at least one of injection timing, fuel pulse duration, and fuel injection pressure.

18. The vehicle system of claim 16, further comprising an exhaust gas recirculation system, and wherein the controller further adjusts the engine speed based on an exhaust gas recirculation rate and the exhaust air-fuel ratio.

19. The vehicle system of claim 16, wherein the exhaust air fuel ratio crossing the threshold includes the exhaust air fuel ratio falling below the threshold, and wherein the threshold is based on an exhaust level particulate matter emission.

* * * * *